(12) United States Patent
Nonninger

(10) Patent No.: US 7,922,964 B2
(45) Date of Patent: Apr. 12, 2011

(54) CERAMIC HOLLOW FIBERS MADE FROM NANOSCALE POWDER PARTICLES

(75) Inventor: Ralph Nonninger, Saarbrücken (DE)

(73) Assignee: ItN Nanovation AG, Saarbruecken (DE)

( * ) Notice: Subject to any disclaimer, the term of this patent is extended or adjusted under 35 U.S.C. 154(b) by 1537 days.

(21) Appl. No.: 10/525,700

(22) PCT Filed: Aug. 30, 2002

(86) PCT No.: PCT/EP02/09698

§ 371 (c)(1), (2), (4) Date: Aug. 25, 2005

(87) PCT Pub. No.: WO2004/020362

PCT Pub. Date: Mar. 11, 2004

(65) Prior Publication Data

US 2006/0154057 A1    Jul. 13, 2006

(51) Int. Cl.
*C04B 33/32* (2006.01)

(52) U.S. Cl. .................. 264/634; 264/610; 264/171.11; 264/182; 264/184; 264/632; 264/628; 264/DIG. 19; 428/364; 428/398

(58) Field of Classification Search .................. 264/610, 264/632, 634, 63, 117.11, 182, 184, 209, 264/628, DIG. 19; 428/364
See application file for complete search history.

(56) References Cited

U.S. PATENT DOCUMENTS

| 4,571,414 | A | * | 2/1986 | Renlund et al. | ............... 524/322 |
| 5,082,607 | A | * | 1/1992 | Tange et al. | ..................... 264/44 |
| 5,707,584 | A | * | 1/1998 | Terpstra et al. | ............... 264/628 |
| 6,573,208 | B1 | * | 6/2003 | Soria et al. | .................. 501/95.1 |

FOREIGN PATENT DOCUMENTS

| DE | 101 14 496 A1 | | 9/2002 |
| FR | 2776287 A1 | * | 9/1999 |
| WO | WO 0130702 A1 | * | 5/2001 |

* cited by examiner

*Primary Examiner* — Kat Wyrozebski
*Assistant Examiner* — Joshel Rivera
(74) *Attorney, Agent, or Firm* — Walter A. Hackler

(57) ABSTRACT

The invention relates to a method for producing ceramic hollow fibers from nanoscale particles and to hollow fibers produced in such a manner. The inventive method is characterized in that the ceramic material has a solids content of >25% by volume, preferably >30% by volume and is processed by means of extrusion and spinning. The hollow fiber is sintered according to conventional sintering methods. A hollow fiber produced in this manner is used for metal, polymer and ceramic matrix reinforcements, for artificial organs, for microsystems technology components, for fiber optical waveguides, for ceramic membranes, for solid electrolyte in fuel cells (SOFC), for tissue engineering and for producing extremely light ceramic parts, such as heat shields or brake systems, that are subjected to temperature stresses. The inventive ceramic batch can also be processed by means of silk screening whereby resulting in the production of filigree structures over the ceramic silk screening.

9 Claims, No Drawings

CERAMIC HOLLOW FIBERS MADE FROM NANOSCALE POWDER PARTICLES

BACKGROUND OF THE INVENTION

The invention relates to a method for the manufacture of a ceramic hollow fiber based on nanoscale oxide particles, preferably yttrium stabilized zirconium oxide, zirconium oxide, titanium dioxide, silica and alumina as well as ceramic hollow fibers manufactured according to this method.

Ceramic fibers are achieving more and more industrial significance wherein especially whole ceramic fibers of alumina are already available in the marketplace. Thus, the firms 3M, Mitsui, Sumitomo and Toyoba already offer continuous aluminum oxide ceramics in price ranges between 400 and 1800 US$/kg. Short ceramic fibers with lengths in the range from 1 μm are of lesser industrial significance due to the fact that these fibers may no longer be processed in Germany for example, based on their lung respirability. New development trends are coming to the fore in the area of the ceramic hollow fibers which are establishing the ceramic hollow fiber principle in all areas in which whole fibers are already established and additionally developing other market segments.

Ceramic hollow fibers, although not yet commercially available, however are the subject of actual developments in many research establishments. In comparison to whole fibers, hollow fibers possess greater bending strength and a higher insulation factor which together with lower material usages, from about 40 to 60 wt %, is accompanied by savings in weight for equal volumes. Added to that is the fact that hollow bodies can be cooled from the inside, and for example heat, and internal materials etc. can be easily transported to the exterior.

The most important fields of application of ceramic hollow fibers are in the areas of metal, polymer and ceramic sheathings, artificial organs, fiber optics, ceramic membranes, solid electrolyte for the (SOFC) fuel cell, tissue engineering, the textile industry, and the manufacture of extremely light, temperature resistive ceramic structural elements such as heat shields or brake systems, which can purposely dissipate heat.

In contrast to planar structures, with the hollow fibers three dimensional and also rotationally symmetrical structures are produced, which also permit flexible use in numerous applications of microsystem technology.

For the economic efficiency of the uses proposed herein it is crucial that the manufactured hollow fibers can be densely packed and as a result guarantee a high surface to volume ratio, ideally the hollow fibers are very small and plastically formable. In the area of fuel cells for example, very large external diameter (in the range of several mm) Y—$ZrO_2$ hollow fibers usable as electrolyte lead to high cathode resistances and to small power densities. In the area of filter membranes, the per unit volume available for stationary specific surface area must be very high, in order to still be able to realize efficient filter systems. Attempts have not succeeded in producing hollow fibers by spinning solutions, gels or brines of the corresponding starting materials, which are then transformed by diverse chemical reactions and physical processes to ceramic fibers. These attempts were limited in that the necessary starting substances are not always available, or that not every wanted phase can be prepared by pyrolytic decomposition and phase conversion but, that by sintering of the hollow fibers (if one wants to prepare a ceramic hollow fiber one must remove the organic processing agent) the shrinkage and thereby the stresses in the hollow fiber becomes so great that the hollow fiber shatters. Up to now, it appears as if by such means only the preparation of $SiO_2$ as hollow glass fibers has succeeded in large quantities (Fraunhofer Institute for Silicate Research (Fraunhofer Institut für Silicatforschung) in Würzburg)

In German Patent 197 01 751 the preparation of an $Al_2O_3$ microhollow fiber is described which was obtained by spinning of an aluminum oxide precursor [$Al_2(OH)_5Cl$], but the disadvantages of the method that were addressed are clear. For one, not all of the necessary starting materials are available. For another, the proportion of organic binder phase in the fibers is so large that sintering of the hollow fibers to produce defect-free ceramic fibers is not possible. In German Patent 197 01 751, individual fibers are heated to 1600° C., held there for one hour and slowly cooled again. Assertions for the defect-free nature of the fibers are likewise lacking like pictures of the calcined fiber. That merely a green fiber was recorded visually is indicative of the technical process difficulties of this method. From our own experiences it can be reported that the preparation of defect-free ceramic components is thus not possible. A variant of the spinning method is described by the same author in German Patent 19 730 996, in which no solution, sol or gel, but a ceramic melt is spun. In this a ceramic starting powder ($Al_2O_3$+aluminosilicate) at 2300° C. was fed through a workpiece nozzle and spun. The nozzle has to be made from a material that can withstand extremely high temperatures (tantalum or tungsten) which departs from the framework of standard, ready available nozzles. This variant of the spinning process produces, in the event that it is manageable, what surely does not represent an economic alternative for production of hollow fibers.

In order to be able to realize dense ceramic hollow fibers having small external and internal diameters and to realize with each economically desirable material, there are two possibilities, either one uses templates, which are removed in a second step and therewith bring about the transition fiber to hollow fibers or however one uses very small ceramic particles, which can then be manufactured into hollow fibers by the usual ceramic shaping methods like electrophoresis, extrusion or tape casting. The smaller the particles employed, the smaller are the fibers produced.

If however one wishes to fabricate ceramic hollow fibers for example for filtration, especially if one wants to advance in the areas of ultrafiltration or nanofiltration, then one must, either prepare the entire hollow fiber from nanoparticles (only in this way can one get into a fine pore sinter step) or however one must make a hollow fiber with layer structure. The latter implies a large pore carrier with a thin layer of nanoparticles to overlay. Commercially available high quality nanoparticles are either amorphous ($SiO_2$) or like böhmite (AlO(OH)), precursors of real nanoparticles (aluminum oxide). During calcining of a multilayer system consisting of a porous carrier and a layer, of for example böhmite, the nanoparticle layer will always come off at the interface with the large pore carriers, since the temperature treatment initiates post-crystallization of the nanoparticles, which triggers a strong shrinkage and severe stresses, which for its part destroys the part. Since there are no commercial high quality (of redispersible primary particle sizes) crystalline nanoparticles, this problem has not been solved.

In summary this means that in addition to the preparation of very small geometries and also the preparation of small ones for filter elements requires the processing of very fine particles. The utilization of sub-micron particles is certainly suitable for this and especially suited I the utilization of nanoscale ceramic particles preferably having primary particle sizes smaller than 100 nm and especially preferred smaller than 20 nm. For realization of ultrafiltration and nanofiltration membranes or for the preparation of flexible, ceramic fibers the use of nanoparticles is indispensable.

The manufacture of ceramic hollow fibers by extrusion of fine particles is described in WO 99/22852. Here a submicron α-Al$_2$O$_3$ powder is employed in order to produce hollow fibers for the filtration area. According to the authors' data the powder is equipped with common commercial binding agents, extruded and calcined at 1300° C., wherein porosity of 35% is produced. The hollow fiber realized in the example had, before the sintering, an external diameter of 3 mm and an internal diameter of 2 mm, after sintering the external diameter was 2.4 mm and the internal diameter shrank to 1.6 mm. The hollow fiber till possessed a porosity of 35% and served for realization of ceramic filters. The linear shrinkage for a powder having a mean specific surface area of 10 m$^2$/g amounted to 20%. Analogous to this U.S. Pat. No. 5,707,584 by the same authors is to be considered, wherein the authors attempt in their Claims to patent an external diameter between 500 μm and 3 mm. From our own experience it can be said that with the method that is described, external diameters of 500 μm are not achievable, an external diameter of 1 mm appears to be the lower limit. Furthermore it appears certain that the Claims only encompass porous hollow fibers, which can be used exclusively for filtration.

In a 1998 published paper [Werkstoffwoche 1998, 12-15 Oct. 1998, Munchen] Gut et al (EMPA) describe their progress in the production of hollow fibers by means of extrusion. So, the manufacture of ceramic hollow fibers using different materials is described in the sub-micron range, wherein the external diameter of the extruded hollow fibers is 150 μm and the internal diameter is 90 μm. The use of very fine nozzles leads to clogging of the tip by agglomerates or oversize grains. An additional problem was de-mixing, which occurred after individual data, due to poor chemical balancing of the powder/binder interaction. Also the preparation of densely sintered hollow fibers is only described in a single case, apart from that this does not succeed in what was adequate merely for use in filter systems.

In summary it can be recorded that the preparation of ceramic hollow fibers enjoys high industrial interest, wherein miniaturization is an advantage for many fields of application, or as the case may be, is decisive for many applications. The preparation of ceramic hollow fibers presupposes the availability of suitable powders for the application, likewise a suitable manufacturing method and sintering to defect-free component. Conventional spinning methods starting from solutions, brines and gels as shaping methods do not enter into consideration since the precursors used here with the high binder content, cannot be converted into hollow ceramic fibers, but at best as the Fraunhofer Gesellschaft has shown, into glass-type hollow fibers. Since the template method has not been mastered economically in these large quantities, only the classical ceramic shaping methods like electrophoresis (experimental stage), tape casting (thin foils must be rolled and bonded) or the extrusion (direct supply in the shape of tubes). The latter are also already used for producing hollow fibers or small ceramic tubes, wherein here the limit in respect to miniaturization has been reached, which depends on the minimum available stable particle sizes of materials employed. The smallest, patented hollow fibers have external diameters above 500 μm, the smallest hollow fibers known from the literature have an external diameter of 150 μm and a lumen (inner diameter) of 90 μm. All known hollow fibers are built from microscale particles and are usually porous, since technical process difficulties make it impossible to achieve close to theoretical density by sintering. The processing of nanoparticles to ceramic hollow fibers has not yet been described and can be viewed as new.

In order to manufacture defect-free hollow fibers for filtration in the area of ultrafiltration or nanofiltration, pore sizes <100 nm, preferably <50 nm and especially preferred <10 nm are necessary, which may be achieved only through the use of nanoparticles. Likewise, only through the processing of nanoparticles can miniaturized hollow fibers with outer diameters of <500 μm, preferably <200 μm and especially preferred <100 μm, be realized. The only ceramic forming method which directly provides the tubular shape is extrusion. For the extrusion ceramic masses must be developed from nanoparticles, whose solid state content >30 vol %, better <35 vol %, since otherwise the hollow fiber are exposed to high stresses during calcination and can be damaged. So that the process is economical to carry out, the manufacture of ceramic masses should moreover be carried out using conventional ceramic processing aggregates under conventional industrial conditions. These requirements that ceramic masses are processed to hollow fibers, based on nanoparticles with degrees of filling and on conventional processing aggregates goes far beyond the state of the art and up to now have not been realized.

The difficulty lies in the processing of nanoparticles. For particles with a particle size of about 10 nm, the specific powder surface area is increased to 250 m$^2$/g. In connection with this the proportion of organic binder must be drastically increased, since the large surface area that is present binds the organic process-aid agent which then is no longer available for adjustment of the rheology. This again leads to very small solids contents in which for example in the extruding pastes whereby the linear shrinkage likewise like the stresses in the component are so large during sintering that all ceramic components such as for example the hollow fibers get destroyed. In the literature therefore only a small amount of information at all is found, for the processing of nanoparticles to ceramic components, since the difficulty always exists, to have sufficiently high solid material content for the sintering. While the processing of the powder particles by means of slip casting, electrophoresis and tape casting is often possible with low solid state contents (suspensions are processed), for ceramic shaping methods like screen printing, injection molding and extrusion ceramic pastes are prepared having suitable rheology and with high solids contents of >30 vol %, however preferably >35 vol %.

The smallest particle sizes, known from the literature for example are still processed by injection molding, have a particle size of 70 nm [Song and Evans, J. Rheologie 40, 1996, 131 ff]. Below 70 nm the primary particle sizes increase drastically and can amount to 250 m$^2$/g for 10 nm particles. The increased interactions thereby between the particles and the organic processing aid and the higher viscosity related thereto reduce the solid state content so drastically, that injection molding is no longer possible. The extrusion of nanoparticles may be seen as analogous to this, which is likewise not known. In the case of silk screening, the preparation of suitable pastes based on nanoparticles is even more difficult, since in the extrusion and injection molding for the dispersion of the nanoparticles, the input of extremely high shear forces to the mold aggregate is possible in principle. For the paste preparation for the silk screening this is not possible, since the organic process aid material used there is usually not stable to shear stress. So, Kawahara et al [Key Engineered Materials, Vol. 159-160, 1999, pp 175-180] describe the situation in the silk screening of nanoparticles as follows. The larger the specific surface area of the nanoparticles is, then the more organic additives are needed for adjustment of the right paste rheology, since otherwise the paste viscosity is so high so that it is no longer processable. Since then again the amount of organic processing aid is too high, this leads to tears and defects t during burning off of the organic. The state of the art in the area of ceramic screen printing with nanoparticles is for example Carolla et al [Adv. Mater. 1999, 11 No. 11] The batches of nanoscale titanium dioxide to prepare with maximal contents of 5.4 Vol % (18.6 wt %), or Volkel et al [Symp. 7 Werkstoffwoche 1996 (1997) 601 ff] whose batches possess a maximal filler material content of 7.7 wt %. The best result in the literature for a ceramic mass from nanoscale particles which were processed by means of silk screening was for a solid state content of 17 vol % (55 wt %). With all these batches it is impossible to produce ceramic structures by means of silk screening.

The object of the present invention consisted of providing a ceramic batch based on nanoscale particles and a method for its manufacture, in which the solid state content of the nanoparticles and thus the powder content of the batch is so high that it can be processed by means of ceramic extrusion to produce hollow fibers. The hollow fibers thus manufactured should after the extrusion possess an external diameter of <500 μm, but preferably <200 μm and especially preferred <100 μm and allow them to be transformed in a downstream process into ceramic hollow fibers. The hollow fibers produced in this manner should each, according to the application area, be porous or be sintered to close to theoretical density.

SUMMARY OF THE INVENTION

This object was surprisingly solved by means of a ceramic batch, comprising at least one ceramic powder having a primary particle size <100 nm, and preferably <50 nm, as well as at least one polymer binder, and at least one oxycarboxylic acid, and at lest one solvent.

A possible alternative is also to add a sacrificial material to the batch in order to get the desired pore sizes.

In this manner it was possible firstly to achieve a sufficiently high powder content in the batch so that with very small nanoscale powders a ceramic shaping is generally possible by extrusion. By the use of surface active oxycarboxylic acid it is feasible furthermore to realize very homogeneous batches, so that problems known from the literature such as de-mixing (see Gut et al (EMPA)) do not occur. This has huge significance for the process technology and product development that is built upon it. In a particularly advantageous manner the so prepared extruded hollow fibers can be transformed into ceramic hollow fibers at significantly lower temperatures than is known from the state of the art. Compared to the state of the art the sintering temperature can be reduced by 100 to 300° C., depending upon the material utilized.

Surprisingly it was also found that ceramic pastes used for hollow fiber production are also suitable for ceramic silk screening.

The ceramic powder employed is a nanoscale ceramic forming powder. This involves especially nanoscale chalcogenide, carbide, or nitride powder. For the chalcogenide powders one can use an oxide, sulfide, selenide, or telluride powder. Nanoscale oxide powders are preferred. Any powder can be utilized which is customarily used in powder sintering. Examples are (if necessary hydrated), oxides like $ZnO$. $CeO_2$, $SnO_2$, $Al_2O_3$, $TiO_2$, $In_2O_3$, $ZrO_2$, yttrium stabilized $ZrO_2$, $Al_2O_3$, $La_2O_3$, $Fe_2O_3$, $Fe_3O_4$, $Cu_2O$, $Ta_2O_5$, $Nb_2O_5$, $V_2O_5$, $MoO_3$, or $WO_3$, but also phosphate silicate zirconate, aluminate and stannate, sulfides such as $CdS$, $ZnS$, $PbS$ and $Ag_2S$, selenides such as $GaSe$, $CdSe$ and $ZnSe$, tellurides such as $ZnTe$ or $CdTe$, carbides such as $WC$, $CdC_2$ or $SiC$, nitrides such as $BN$, $AlN$, $Si_3N_4$ and $Ti_3N_4$, corresponding mixed oxides such as metal-tin oxide for example indium-tin oxide (ITO), antimony-tin oxide fluorine-doped tin oxide and Zn-doped $Al_2O_3$, luminous pigments with Y or Eu containing compounds, or mixed oxides with perovskite structure such as $BaTiO_3$ and lead zirconate titanate (PZT) Moreover, mixtures of the listed powder particles can be employed.

The batch in accordance with the invention preferably contains nanoscale particles, whether one is dealing with an oxide, oxide hydrate, calcogenide, nitride, or carbide of Si, Al, B, Zn, Zr, Cd, Ti, Ce, Sn, In, La, Fe, Cu, Ta, Nb, V, Mo or W, especially preferred of Si, Zr, Al, B, W and Ti. Especially preferred are oxides, Preferred nanoscale inorganic solid state particles are aluminum oxide, zirconium oxide, titanium oxide, silicon carbide, tungsten carbide and silicon nitride.

The inorganic particles contained in the batch generally have an average particle size in the range of 1 to 300 nm or 1 to 100 nm, preferably 5 to 50 nm and especially preferred 5 to 20 nm. The primary particles can also be present in agglomerated form, it is preferred though that they are not agglomerated or essentially un-agglomerated.

For the purposes of shaping, the starting powder is mixed with an organic binder, which ensures the necessary plasticity of the mixture. The ceramic batch in accordance with the invention contains at least one polymeric binder and at least one oxycarboxylic acid and at least one solvent.

As polymeric binder, any thermoplastic polymer can be used especially those which are normally used for extrusion. Examples of applicable thermoplastic polymers are polyolefins, such as polyethylene, dialkylphthalate (dimethylphthalate, diethylphthalate, dipropylphthalate, dibutylphthalate), polypropylene and poly-1-butane, polymethyl(meth)acrylate, polyacrylonitrile, polystyrene and polyvinyl alcohol, polyamides, polyesters, polyacetates, polycarbonates, linear polyurethanes and corresponding copolymers, such as ethylene-vinyl acetate (EVA) copolymers, as well as biopolymers like cellulose, ambergum, etc., wherein polyacrylates, polymethacrylates, cellulose and ambergum are preferred. A thermoplastic polymer or a mixture of two or more thermoplastic polymers can be employed.

In a special embodiment of the method acrylates and methacrylates are utilized, which by use of a radical starter, after the shaping, can be cross-linked by means for example of UV radiation, or by thermal means, and thus to form the necessary polymer components inside the batch in accordance with the invention. Here all those acrylate and methacrylate compounds found commercially are suitable, preferably however those sold by BASF under the Lucin and Laromer labels, such as LR8765, ES81, LR8713, LR8986, PE55F, PE56F, LR8793, LR8846, LR9004, LR8799, LR8800 LR8907, LR8981, LR8992, PE55W, LR8895, LR8949, LR8983, LR8739, LR8987, LR8748, LR8863, LR8945, LR8967, LR8982, LR8812, LR8894, LR8997, LR8864, LR8889, LR8869, LR8996, LR8946 LR8899, LR8985.

As radical starter all radical starters known to those skilled in the art can be used. This method is suited especially, when silk screening is employed as the ceramic shaping method and by use of masking technology a desired structuring ought to be achieved.

In order to produce the requisite compatibility between the ceramic particles and the polymer matrix, molecules having interfacial activity are employed. The molecules must have a bi-functional structure, so that one potion of the molecule binds to the particle surface, and another part of the molecule achieves compatibility to the matrix. Here special bi-functional molecules from the class of carboxylic acids, of carboxylic acid amides, of carboxylic acid esters, of carboxylic acid chlorides, of β-diketones, of alkyl silanes and especially of oxycarboxylic acids. In a preferred embodiment of the method, oxycarboxylic acids, the trioxadecanoic acid and the dioctaheptanoic acid.

Other components of the ceramic batches contain one organic solvent or a mixture of two or more organic solvents preferably from the alkyleneglycols, especially ethylene glycol, propylene glycol, diethyleneglycolmonobutylether, diethyleneglycolmonoallylether, diethyleneglycolmonohexylether, diethyleneglycolmonodecylether diethyleneglycolmonoethylether and structurally similar molecules can be employed. In a preferred embodiment an alcohol mixture from ethylene glycol and diethyleneglycolmonobutylether is employed.

In an especially preferred embodiment, water is employed as solvent. With water as solvent the extrusion of nanoparticles to hollow fibers is successful merely the silk screening as shaping method for the ceramic masses in accordance with the invention can not be made to work with water as the solvent. Here the organic solvent or the combination of a plurality of organic solvents given above is exigent.

The nanoscale powders are compounded with the polymers, the oxacarboxylic acid and the solvent or solvent mixture in conventional mixing and kneading equipment. Suitable devices for compounding are kneaders, double-screw extruders, heavy roll compactors, three-roll looms and mortar mills. The mixing and kneading process is carried out for a sufficient time until a homogeneous mixture is obtained. The suitable parameters, such as temperature required, needed shearing action and so forth for optimal compounding are known to those skilled in the art.

Following thorough mixing of the above components a portion of the dispersing medium can be removed (preferably under vacuum), until the ceramic mass has the wanted solids content for the particular shaping method, preferably extrusion. Preferred solid contents of the ceramic masses are at least 20 vol % and preferably 25 vol % and especially preferred >30 vol %. In a particularly advantageous way the so-prepared batches can also be employed as silk screening pastes.

After the shaping, the molded ceramic body can be dried in the usual way, removed and finally further processed to the finished sintered body. The manufactured ceramic body prepared in the above manner, especially the ceramic hollow fibers can be dried crack-free and sintered.

Self-evidently the shaping method can also be modified so that the extrusion mass is placed in a special container or a pressure vessel of a spinning device as is commonly utilized in textile or chemical-fiber filament production and at a temperature between room temperature and 300° C. transferred to the spinning device. The spinning device can be equipped suitably with a multiplicity of stainless steel nozzles, which nozzles have an opening width between 1 and 500 µm, and preferably between 30 and 100 µm. As the nozzle material, all of the materials known to a person skilled in the art may be used, especially sapphire nozzles and stainless steel nozzles. The individual fibers may be coiled up directly on a sink unit with infinitely variable rotation speed.

With aid of the ceramic masses in accordance with the invention, hollow fibers can be manufactured that again serve for the manufacture of ceramic membranes with pore sizes between 0.5 nm and 1000 nm, preferably between 0.5 nm and 200 nm, and especially preferred between 1 nm and 100 nm. In order to realize the preferred pore sizes in the hollow fiber, the hollow fibers constructed from nanoscale starting materials are calcined at the appropriate temperature, or however the ceramic mass is enlarged through the addition of sacrificial materials. The sacrificial material is a carbon based organic or inorganic component and is added in amounts between 5 and 20 wt %.

The following examples explain the invention without limiting it.

EXAMPLE 1

The processing of nanoscale yttrium stabilized zirconium oxide is carried out in a commercially available aggregate mixer, wherein the powder content is set at 72 wt % (31 vol %). For this purpose 300 g of a solvent mixture of ethylene glycol and dethyleneglycolmonobutylether in a 1:1 ratio are provided. To this mixture, 700 g of nanoscale zirconium oxide, modified with dioctaheptanoic acid, was added. After further addition of 140 g of an acrylate-based binder system (Lacromer, BASF) as well as a radical starter the mixture is homogenized. The paste thus prepared is then silk-screened under pressure to a produce a flat layer on a ceramic or metal substrate. Using masking technology and exposure to UV radiation, polymerization produces extremely fine structures. The area that remains unpolymerized can be removed by means of washing.

EXAMPLE 2

The processing of nanoscale yttrium doped zirconium oxide is carried out by extrusion of commercially available aggregate mixer, wherein the powder content is set at 72 wt % (31 vol %). For this purpose 300 g of a solvent mixture of ethylene glycol and dethyleneglycolmonobutylether in a 1:1 ratio are provided. To this mixture, 700 g of a nanoscale zirconium oxide modified with dioctaheptanoic acid, is added. After further addition of 140 g of an acrylate-based binder system (Lacromer, BASF) as well as a radical starter the mixture is homogenized. The paste thus prepared is then processed further by means of extrusion to ceramic hollow fibers. For this purpose the ceramic mass is extruded through a sapphire nozzle having an external nozzle diameter of 100 µm and an internally centered arbor. Altogether 7 of these nozzles were mounted in a steel frame and were extruded under a pressure of between 10 and 30 MPa. The individual fibers were finally picked up on a reel with infinitely variable rotation speed, where the line speed was five meters per second. After cross-linking, the microhollow fibers had an external diameter of 70 µm and an internal diameter of 50 µm. From this continuous fiber 20 cm lengths were cut off, which were either stapled together or interwoven. After releasing the organic component and sintering for two hours at 1050° C. a ceramic hollow fiber or web of ceramic hollow fibers was obtained. The ceramic hollow fibers had an external diameter of 56 µm and an internal diameter of 40 µm, and a density of 97%.

EXAMPLE 3

A method analogous to Example 2, however 65 g of a sacrificially serving active carbon was added to the batch. Following 2 hours of sintering at 1050° C., a porous hollow fiber was obtained. The porosity was 35%, and the mean pore size was 5 nm.

EXAMPLE 4

The processing of nanoscale aluminum oxide by extrusion is carried out in a commercially available aggregate mixer, wherein the powder content is set at 71 wt % (37 vol %). For this purpose 300 g of a solvent mixture of ethylene glycol and dethyleneglycolmonobutylether in a 1:1 ratio are provided. To this mixture, 700 g of a nanoscale zirconium oxide modified with dioctaheptanoic acid, are added. After further addition of 140 g of an acrylate-based binder system (Lacromer, BASF) as well as a radical starter the mixture is homogenized. The paste thus prepared was then further processed by means of extrusion to ceramic hollow fibers. For this purpose the ceramic mass is delivered through a sapphire nozzle with an external nozzle diameter of 100 µm and an internally centered arbor. Altogether 7 of these nozzles were mounted in a steel frame and extruded under a pressure of between 10 and 30 MPa. The individual fibers were finally picked up on a reel with infinitely variable rotation speed, where the line speed was five meters per second. After cross-linking, the microhollow fibers had an external diameter of 70 µm and an internal diameter of 50 µm. From this continuous fiber, 20 cm lengths were cut off, which were either stapled together or interwoven. After releasing the organic component and sintering for two hours at 950° C. a ceramic hollow fiber or web of ceramic hollow fibers was obtained. The ceramic hollow fiber had an external diameter of 60 µm and an internal diameter of 45 µm, and a density of 98% of theoretical.

EXAMPLE 5

The processing of nanoscale zirconium oxide is carried out by extrusion in a commercially available aggregate mixer, wherein the powder content is set at 72 wt % (31 vol %). For this purpose 300 g of a solvent mixture of ethylene glycol and dethyleneglycolmonobutylether in a 1:1 ratio are provided. To this mixture, 700 g of a nanoscale zirconium oxide modified with dioctaheptanoic acid, was added. After further addition of 140 g of an acrylate-based binder system (Lacromer, BASF) as well as a radical starter the mixture is homogenized. The paste thus prepared is then further processed by means of extrusion to ceramic hollow fibers. For this purpose the ceramic mass is delivered through a sapphire nozzle with an external nozzle diameter of 100 µm and an internally centered arbor. Altogether 7 of these nozzles were mounted in a steel frame and were extruded under a pressure of between 10 and 30 MPa. The individual fibers were finally picked up on a reel with infinitely variable rotation speed, wherein the line speed was five meters per second. After cross-linking and drying, the microhollow fibers had an external diameter of 70 µm and an internal diameter of 50 µm. From this continuous fiber 20 cm lengths were cut off, which were either stapled together or interwoven. After releasing the organic component and sintering for two hours at 950° C. a ceramic hollow fiber or web of ceramic hollow fibers was obtained. The ceramic hollow fiber had an external diameter of 60 µm and an internal diameter of 44 µm, and a porosity of 37%.

I claim:

1. A method for manufacturing ceramic hollow fibers from nanoscale powders, the method comprising:
    manufacturing a ceramic mass by transforming a nanoscale metal oxide, carbide, nitride or sulfide powder with an oxycarboxylic acid, compounded to the ceramic mass with at least one solvent and an acrylate and/or methacrylate as a polymeric binder, the metal oxide, carbide, nitride, or sulfide powder having a particle size of between 1 and 50 nm and the ceramic mass having a solid content greater than 30 vol %;
    adding to the ceramic mass a carbon based, organic or inorganic component as a sacrificial material in amount between 5 and 20 wt %;
    extruding or spinning the ceramic mass to hollow fiber blanks;
    polymerizing the acrylate and/or methacrylate binder by using a radial starter; and
    sintering the blanks to form fibers having an external diameter <200 µm and a pore size of between 0.5 and 100 nm.

2. The method according to claim 1 wherein the nanoscale powder is aluminum oxide, zirconium oxide, yttrium stabilized zirconium oxide, titanium oxide, silicon carbide, tungsten carbide and/or silicon nitride.

3. The method according to claim 1 wherein the oxycarboxylic acid is selected from a group consisting of trioxadecanoic acid and dioctaheptanoic acid.

4. The method according to claim 1 wherein the solvent is selected from a group consisting of water, ethyleneglycol, propyleneglycol, diethyleneglycolmonoethylether, diethyleneglycolmonobutylether, and a mixture of ethyleneglycol and diethyleneglycolmonobutylether.

5. The method according to claim 1 wherein as polymer binder, a cellulose, methylcellulose, ethylcellulose, polyvinylalcohol, ambergum, a polyacrylate and/or polymethacrylate is utilized.

6. The method according to claim 1 wherein before extruding the ceramic mass is placed in a pressure vessel of a spinning device and conveyed through the spinning device between room temperature and 300° C.

7. The method according to claim 1 further comprising forming the ceramic hollow fibers into a web shape before sintering, said web retaining shape after sintering.

8. The method according to claim 1 further comprising forming the ceramic hollow fibers into one of a group consisting of matrix reinforcements for artificial organs, components in microsystems for optical waveguides, ceramic membranes for the solid electrolyte in fuel cells (SOFC) or tissue engineering and light weight ceramic parts for temperature stressed components such as heat shields and brake systems, before sintering.

9. A method for manufacturing ceramic hollow fibers from nanoscale powders, the method comprising:
    manufacturing a ceramic mass by transforming a nanoscale metal oxide, carbide, nitride or sulfide powder with an oxycarboxylic acid, compounded to the ceramic mass with at least one solvent and an acrylate and/or methacrylate as a polymeric binder, the metal oxide, carbide, nitride, or sulfide powder having a particle size of between 1 and 50 nm and the ceramic mass having a solid content greater than 30 vol %;
    adding to the ceramic mass a carbon based, organic or inorganic component as a sacrificial material in amount between 5 and 20 wt %;
    extruding or spinning the ceramic mass to hollow fiber blanks;
    polymerizing the acrylate and/or methacrylate binder by using a radial starter; and
    sintering the blanks to form fibers having an external diameter <100 µm and a pore size of between 0.5 and 100 nm.

* * * * *